Dec. 26, 1922.
E. A. BARTEZKI.
Dog Operating Device.
Filed Nov. 15, 1919.
1,439,992
2 SHEETS-SHEET 1
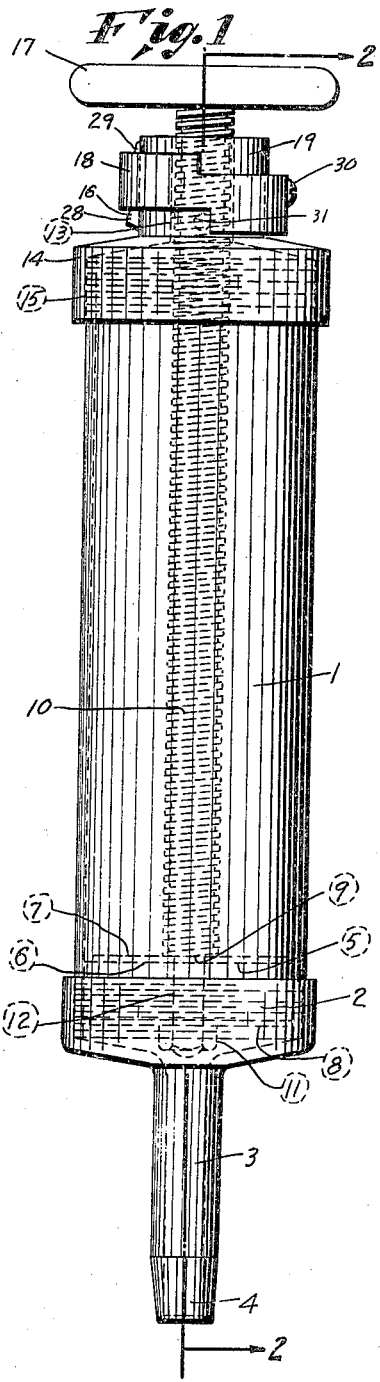
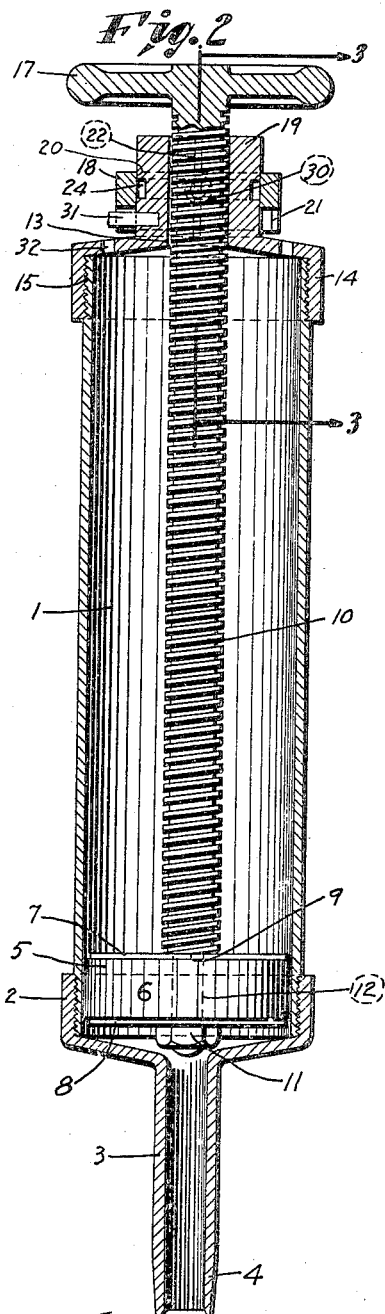
INVENTOR:
Emil A. Bartezki,
BY Hugh K. Wagner
ATTORNEY.

Dec. 26, 1922.

E. A. BARTEZKI
DOG OPERATING DEVICE.
FILED NOV. 15, 1919.

INVENTOR
Emil A. Bartezki,
BY
Hugh K. Wagner,
ATTORNEY.

Patented Dec. 26, 1922.

1,439,992

UNITED STATES PATENT OFFICE.

EMIL A. BARTEZKI, OF ST. LOUIS, MISSOURI.

DOG-OPERATING DEVICE.

Application filed November 15, 1919. Serial No. 338,258.

*To all whom it may concern:*

Be it known that I, EMIL A. BARTEZKI, a citizen of the United States, residing at the city of St. Louis, in the State of Missouri, have invented certain new and useful Improvements in Dog-Operating Devices, of which the following is a specification.

This invention is a grease or oil gun. In its structure is embodied the ordinary plunger-type of such a device and also means for actuating the same by means of a screw. It is convertible from one of these forms to the other and vice versa. Means is provided for holding the parts for actuation in one of these ways and for releasing the same so as to be actuated in the other manner. For oil or light grease, it will be used in its plunger form; and for thick grease or in cold weather when light grease solidifies it will be used with the screw force-feed.

In the accompanying drawings forming part of this specification, in which like numbers of reference denote like parts wherever they occur, Figure 1 is a side elevation, with internal parts shown in dotted lines;

Figure 2 is a longitudinal sectional view taken on the line 2—2 in Figure 1;

Figure 3:
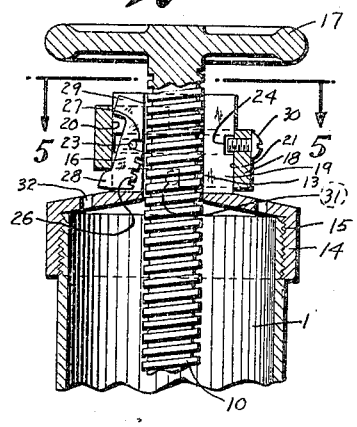
Figure 3 is a sectional view taken on the line 3—3 in Figure 1.

The plunger 5 is preferably composed of resilient gasket-like material, such for instance as cork 6, having a pair of plates 7 and 8 lying on the inner and outer side of the said resilient member 6. The shoulder 9 of screw 10 abuts against plate 7, and nut 11 forces the plunger 5 into such abutting position and holds it there. The plunger 5 is free to turn upon the plain stem 12 of screw 10.

Screw 10 is long enough to extend from one end to the other of the interior of cylinder 1 and through the passage 13 (which is not screw-threaded) through cap 14, which screws at 15 upon one end of cylinder 1.

Figure 4:
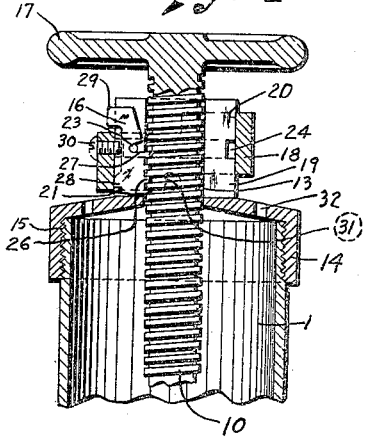
Figure 4 is a view similar to Figure 3, but with the parts in a different position.
Figure 5:
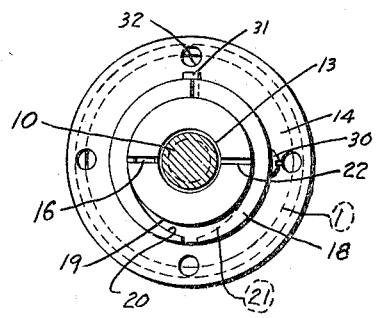
Figure 5 is a view taken on the line 5—5 in Figure 3.
Figure 6:
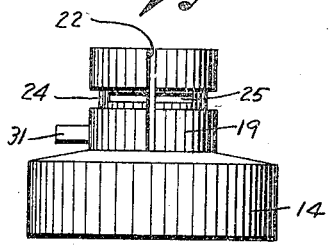
Figures 6 and 7 are details of the retaining and transforming cap.

When the parts, particularly the dog 16, are in the position shown in Figure 4, the screw 10 is used as a screw to cause the plunger 5 to travel in either direction. Rotation of handwheel 17 causes screw 10 to wind of dog 16 and the movement of the plunger 5 is in either direction, dependent upon the direction of rotation of wheel 17.

Movement of dog 16 out of engagement with screw 10 to the position shown in Figure 3 results in leaving screw-member 10 free to move back and forth as an ordinary plunger-rod, inasmuch as passage 13 is not screw-threaded.

A ring 18 revolubly mounted on hub 19 of cap 14, having a pair of cam-faces 20 and 21, is adapted to move dog 16 either into or out of engagement with screw 10 when the said cam is rotated in one direction or the other.

Dog 16 lies in slot 22 in hub 19 and rocks therein on pin 23, which lies in groove 24 and more particularly in the flattened part 25 of groove 24.

One end of dog 16 is provided with teeth 26, which are adapted to mesh with the threads of screw 10 when engaged therewith, as shown in Figure 4. The opposite end of dog 16 is plain, and screw 10 can slide past dog 16 when dog 16 has been tilted to the position shown in Figure 3. The device is used as a slidable plunger when dog 16 is in the position shown in Figure 3 and is used as a screw feed when dog 16 is in the position shown in Figure 4. Pin 23 fits in a notch 27 in dog 16.

Dog 16 is provided with a pair of upwardly projecting lugs 28 and 29, adapted to be engaged respectively by the cam-faces 20 and 21 on the inside of ring 18. Ring 18 encircles hub 19. When rotated in one direction the cam-face 21 on the interior of ring 18 engages lug 28 and thereby forces teeth 26 into engagement with screw 10. Movement in the opposite direction not only releases lug 28 from pressure of cam-face 20, but when continued causes cam-face 20 to engage lug 29, which results in dog 16 being rocked on pin 23, whereby teeth 26 are unmeshed from screw 10 and held away therefrom. Screw 30 protrudes into groove 24 and holds ring 18 in place. Stop 31 prevents too great rotation of ring 18. Vent 32 is for the escape of air, to prevent binding.

The binding of cam-faces 20 and 21 upon lugs 28 and 29 is so tight that this forms a sufficient lock against loosening rotation of ring 18.

Figures 7, 8:
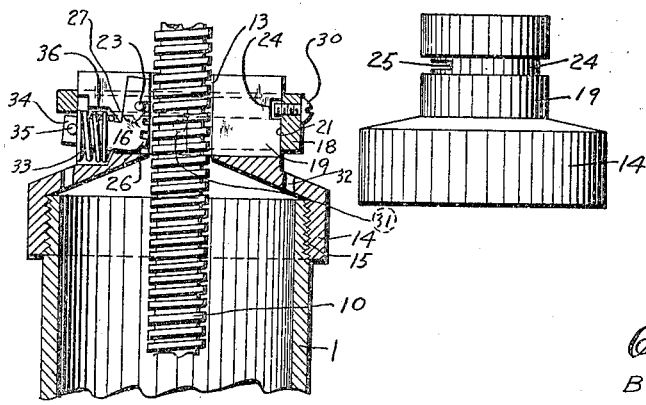
Figure 8 is a modification of Figure 3.

If desired, lug 29 and cam-face 20 may be omitted, as shown in Figure 8, and a spring 33, mounted on a stem 34, having a head 35, may be substituted therefor; the said spring being attached to the toothed end of dog 16 and mounted in an opening 36 in ring 18. By this means, whenever ring 18 is so rotated as to disengage cam 21 from stem 34, spring 33 will instantly exert a pull on the toothed end of dog 16, thus disengaging teeth 26 from the threads on screw 10 and tilting dog 16 to the position shown in Figure 3.

Having thus described this invention, I hereby reserve the benefit of all changes in form, arrangement, order, or use of parts, as it is evident that many minor changes may be made therein without departing from the spirit of this invention or the scope of the following claims.

I claim:

1. The combination with a feed screw and a member thru which said screw passes, of a dog pivotally supported by said member, said dog provided on one side of the pivot with a smooth portion adapted for sliding engagement with the screw and on the opposite side of the pivot with a toothed portion adapted for threaded engagement with the screw, and means for rocking said dog on its pivot to engage either the smooth or the threaded portion with the screw, said means comprising a rotatable member having a pair of diametrically opposite cam surfaces offset vertically to lie in planes one above the other and adapted to be successively engaged with the dog on opposite sides of the pivot.

2. In combination, a feed screw, a tubular slotted member through which the said screw is adapted to pass, a pivot pin, a dog having a toothed portion, the said dog being mounted in the slot in the said member on the said pivot pin and the said pivot pin traversing an intermediate part of the said dog, said dog having end lugs extending laterally from the slot to project beyond the outer circumferential wall of said tubular member, and a rotatable ring encircling said member and provided with means for successively engaging said lugs to move the toothed portion of the dog into and out of engagement with said screw.

3. The combination with a feed screw, of a pivotally mounted dog having a toothed portion at one side of the pivot adapted for threaded engagement with the screw, and a rotatable ring surrounding the screw and dog and carrying oppositely disposed cam surfaces offset to lie in different planes and adapted to successively engage the dog on opposite sides of the pivot to positively actuate the dog into and out of threaded engagement with the screw.

In testimony whereof I hereunto affix my signature.

EMIL A. BARTEZKI.